United States Patent
Mielke et al.

(10) Patent No.: US 6,726,865 B2
(45) Date of Patent: Apr. 27, 2004

(54) COMPOSITE MATERIAL FOR VEHICLE HULLS AND A HULL MOLDING PROCESS

(75) Inventors: Dan Mielke, New Smyrna Beach, FL (US); Scott Wood, New Smyrna Beach, FL (US)

(73) Assignee: Boston Whaler, Inc., Edgewater, FL (US)

( * ) Notice: Subject to any disclaimer, the term of this patent is extended or adjusted under 35 U.S.C. 154(b) by 278 days.

(21) Appl. No.: 09/760,314

(22) Filed: Jan. 10, 2001

(65) Prior Publication Data

US 2002/0089076 A1 Jul. 11, 2002

(51) Int. Cl.[7] .............................................. B29C 41/02
(52) U.S. Cl. ...................... 264/102; 156/245; 264/255; 264/258
(58) Field of Search ............................... 264/46.5, 46.6, 264/102, 255, 258; 156/245; 269/102

(56) References Cited

U.S. PATENT DOCUMENTS

| | | | |
|---|---|---|---|
| ,272,663 A | | 2/1883 | Durant |
| 3,013,922 A | * | 12/1961 | Fisher ........................ 264/46.5 |
| 3,124,626 A | * | 3/1964 | Graham et al. ............. 264/45.4 |
| 3,176,055 A | * | 3/1965 | Loos ........................... 264/46.5 |
| 3,211,814 A | * | 10/1965 | Kohrn et al. ................ 264/46.5 |
| 3,342,665 A | | 9/1967 | Shannon ....................... 161/36 |
| 3,531,809 A | * | 10/1970 | Hegg ........................... 114/357 |
| 3,711,581 A | | 1/1973 | Fowler, Jr. et al. ........... 264/45 |
| 3,831,212 A | * | 8/1974 | Moore et al. ................ 114/357 |
| 4,065,337 A | | 12/1977 | Alter et al. .................... 156/78 |
| 4,073,049 A | * | 2/1978 | Lint ............................. 29/458 |
| 4,568,604 A | * | 2/1986 | Kurtz et al. .................. 428/297 |
| 4,953,494 A | | 9/1990 | McClendon, Jr. ............. 114/357 |
| 5,063,870 A | * | 11/1991 | Wagner ....................... 114/357 |
| 5,372,763 A | | 12/1994 | Hordis ........................ 264/46.5 |
| 5,421,283 A | | 6/1995 | Bruggemann et al. ....... 114/357 |
| 5,634,425 A | | 6/1997 | MacDougall ................ 114/357 |
| 5,861,119 A | | 1/1999 | Merser ....................... 264/46.4 |
| 6,394,014 B1 | * | 5/2002 | Waldock ..................... 114/61.1 |

* cited by examiner

*Primary Examiner*—Allan R. Kuhns
(74) *Attorney, Agent, or Firm*—Malin, Haley & DiMaggio, P.A.

(57) ABSTRACT

A composite material for vehicle hulls and a hull molding process comprising a gel coat, a skin coat, a bulk fiberglass layer and adhesive applied to a top mating surface and a bottom mating surface within a top mold and a bottom mold, wherein the adhesive forms a connector. The two molds are placed together, and after the adhesive sets, foam is introduced into at least one cavity formed when the molds are brought together. The molds remain closed while the foam is introduced.

7 Claims, 4 Drawing Sheets

COMPOSITE MATERIAL FOR VEHICLE HULLS AND A HULL MOLDING PROCESS

BACKGROUND OF THE INVENTION

1. Field of the Invention

This invention relates generally to the field of molding vehicle hulls.

2. Description of Related Art

Various composite materials for vehicle hulls and processes of forming hulls of vehicles are known in the art. Several hulls in the marine industry incorporate molding processes for the surface elements of the shell of the vehicle. Also, several boats incorporate filling of an inner and outer shell with a core material.

U.S. Pat. No. 5,372,763 issued Dec. 13, 1994 to Hordis ("Hordis") describes a method of forming a transom for a boat. Hordis teaches the use of offset keys to space an inner and an outer transom.

A method of molding a composite framed resin article is described in U.S. Pat. No. 3,711,581 issued Jan. 16, 1973 to Fowler, Jr. et al. ("Fowler"). Fowler teaches a molded article with spaced rods between the layers of the articles to provide support.

U.S. Pat. No. 5,861,119 issued Jan. 19, 1999 to Merser ("Merser") teaches a method of forming structural panel assemblies. Merser incorporates parallel structural assemblies secured by a foam adhesive.

A boat hull including molding hull structure is taught in U.S. Pat. No. 5,634,425 to MacDougall ("MacDougall"). MacDougall includes a plurality of longitudinally extending stiffening members.

U.S. Pat. No. 5,421,283 to Bruggemann describes a type of lightweight boat construction that incorporates a PVC pipe frame.

A method for molding large plastic unitary core boats is described in U.S. Pat. No. 4,953,494 to McClendon, Jr. ("McClendon"). In McClendon, the inner core of the boat is molded separately from a matching outer ection.

U.S. Pat. No. 4,065,337 to Alter et al. ("Alter") teaches a molding process. In Alter, formed sheets that comprise the shell of the hull must rest on frames during manufacture.

Reinforced structural panels are taught in U.S. Pat. No. 3,342,665 to Shannon, and U.S. Pat. No. 272,663 to Durant describes a method of building veneer boats.

The prior art does not teach or suggest a method of structurally bonding two hull sections to one another prior to the introduction of foam.

The prior art references do not teach a hull molding process that teaches the bonding of two hull sections before the introduction of foam. The prior art does not teach the use of an adhesive to form a connector between the two sections of the hull. Also, the prior art references do not teach a method of bonding two shell portions of a hull together while the hull is still in the molds, and then introducing foam while the shell portions are in the mold. Stringers, or braces, are generally required in the forming of a vehicle hull. What is needed in the art is a method of forming a foam-filled hull which does not use stringers.

BRIEF SUMMARY OF THE INVENTION

This invention generally relates to a composite material that is to be used for vehicle hulls. There are several methods of forming hulls available. However, the processes generally include the use of stringers, which add to labor costs and uncertainty in the marriage between the two outer layers of the hull. Furthermore, without stringers, in the formation of a foam-center hull the top layer may squeeze against the lower layer, and there would be insufficient volume between the layers for the foam to be introduced between the layers. Alternatively, the expansion of the foam may cause a bond between a top layer and a bottom layer to be pulled apart.

The process of the present invention provides for the molding of a top and a bottom layer. After the top layer and the bottom layer are formed in molds, an adhesive is placed between mating portions of the top and bottom pieces, and the molds are closed together. After the molds are closed, the adhesive operates to form a connector between the top piece and the bottom piece, forming a single piece from the top and bottom layers, with at least one central cavity formed by the closing of the top piece to the bottom piece. While the mold is still closed, foam is introduced into the cavity, forming a core within the cavity. Since the molds are still in place when the foam is introduced, and the adhesive has connected the top piece with the bottom piece. With the connector in place, the expansion of the foam does not force the single piece apart.

In accordance with these and other objects that will become apparent hereinafter, the instant invention will now be described with particular reference to the accompanying drawings.

DETAILED DESCRIPTION OF THE INVENTION

Figure 1:
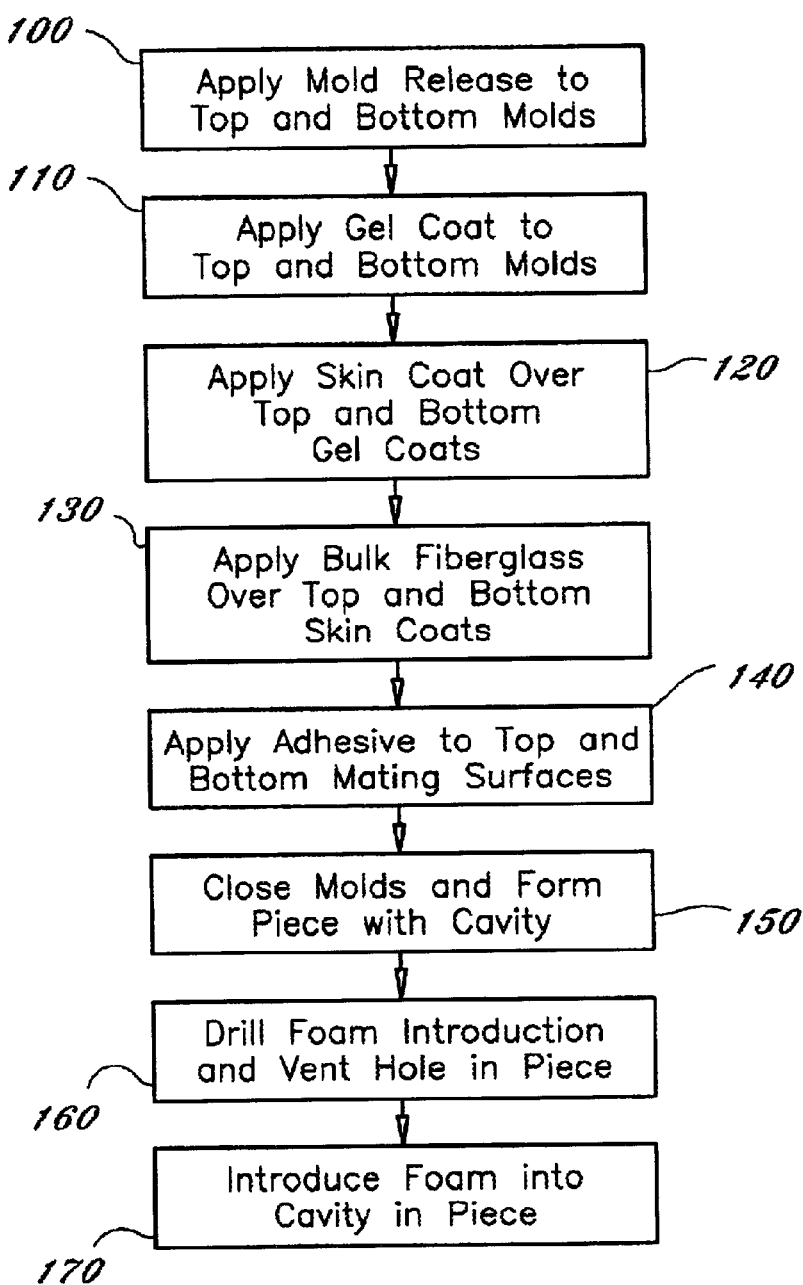
FIG. 1 is a block diagram of a method for molding a vehicle hull.

As seen in FIG. 1, a method is illustrated for the molding of a composite material for vehicle hulls. The molds contemplated are open molds known in the maritime industry, or their equivalent, and comprise a top mold and a bottom mold. In the preferred embodiment, the molds are structurally reinforced.

A mold release is first applied to the bottom mold and the top mold 100. The mold release is preferred to be one suitable for multiple releases, such as Prekote®. However, other releases are known in the art and are contemplated in this invention.

A gel coat is then applied to a bottom mold and a top mold 110. The bottom gel coat and the top gel coat serve as a protective coating for the single piece released from the mold from ultraviolet light degradation. In the preferred embodiment, the gel coat material is one generally known in the marine industry, such as Cook Composites and Polymers' (CCP's) vendor number 953WF365 gel coat. However, other gel coats and protective coatings are known in the art and are contemplated by this invention. For example, a premium grade marine gel coat such as Mese® or MP® may be used in the practice of the invention. A different protective coating may be used on the top mold from the gel coat used on the bottom mold.

A bottom skin coat is applied over the bottom gel coat, and a top skin coat is applied over the top gel coat 120. In the preferred embodiment, the skin coat material comprises fiber-reinforced plastic, such as a glass fiber in a resin matrix. The glass is preferably electrical glass as is manufactured by PPG, Inc., in the form of chopped roving. The resin is preferably a spray resin such as a monolester DCPD blend manufactured by Ashland, Inc. However, other resins with comparable properties are known in the art.

Air may be trapped between the top gel coat and the top skin coat and between the bottom gel coat and the bottom skin coat. In the preferred embodiment, the air is removed. Air may be removed by means such as placing the molds in a vacuum environment, rolling out the top skin coat and the bottom skin coat or other known means. When rolling is performed it is preferred that it be done by hand using resin consolidation tools such as rollers or paint brushes. Where air is still trapped after rolling, the hardness of the bottom skin coat and the top skin coat is checked, and, when they have hardened, trapped air may be ground out of the layer between the top gel coat and the top skin coat and the bottom gel coat and the bottom skin coat. Preferably, the grinding is accomplished with a pneumatic die grinder. However, the grinding alternatively may be accomplished by hand.

In addition, air may be trapped within the top skin coat or the bottom skin coat. Air is preferably removed as was described above. After the top skin coat and the bottom skin coat harden, the air trapped within the top skin coat and within the bottom skin coat may be ground out with with a pneumatic die grinder. However, as also stated above, the grinding may be accomplished by hand.

On top of the skin coat, bulk fiberglass is applied on both the bottom mold and the top mold 130. Preferably, the bulk fiberglass is applied in two layers. The first layer is chopped roving, such as the chopped roving of the skin coat. The second layer is knitted bi-directional reinforced fiberglass. Examples of the reinforced fiberglass for use in the invention are Brunswick Technologies, Inc.'s CM 2415, CM 3215 and XM 1808B, and Hexcel Corporation's Knytex®. However, the bulk fiberglass may also be knitted bi-directional reinforced fiberglass without the roving, or other similar forms of bulk fiberglass known in the art. The bulk fiberglass is wetted down by a spray resin such as a monolester DCPD blend.

As discussed above, air may be trapped between the top skin layer and the top layer of bulk fiberglass and between the bottom skin layer and the bottom layer of bulk fiberglass. It is preferred that this air be removed. Methods include those discussed above. Where rolling is done, it is preferred to be done with resin consolidation tools such as rollers or paint brushes.

Reinforcements may be applied before or during the process of laying the bulk fiberglass 130. The reinforcements may be wood, such as plywood, phenolic, such as Whale Board® by Ranier RichLite, Inc., or of other suitable materials. Generally, the reinforcements are for attachment points on the finished boats, such as cleats. Preferably, the reinforcements are incorporated into the bulk fiberglass. For example, in the preferred embodiment, the reinforcements are placed between the chopped roving and the knitted bidirectional reinforced fiberglass. However, the reinforcements may alternatively be added above or below the entire bulk fiberglass layer.

After the bulk layer has been applied and wetted down, it is given time to cure. After it has cured, a bottom bonding surface and a top bonding surface have been formed in the molds. It is preferred that any bumps and overlaps are ground out with a pneumatic die grinder at this point of the process. However, the grinding alternatively may be accomplished by hand.

The portion of the bottom bonding surface and the portion of the top bonding surface that are to be in contact with each other comprise a top mating surface and a bottom mating surface. An adhesive is applied to the top mating surface and the bottom mating surface 140. Preferably, the adhesive is applied to one surface and is applied to the other surface when the surfaces are brought into contact with each other. Alternatively, the adhesive may initially be applied to both mating surfaces approximately at the same time. In the preferred embodiment, the adhesive is a methacrylate compound and is applied by a bulk MeterMix® dispensing machine. However, other adhesives are well known in the art. Contact is made between the top mating portion and the bottom mating portion before the adhesive cures.

The adhesive forms a connector between the top mating surface and the bottom mating surface. The connector allows the single piece to be formed to resist the pressure of foam to be introduced. The connector thus takes some of the stress away from the top bonding surface and the bottom bonding surface. For an adhesive such as methacrylate, the preferred distance between the top mating portion and bottom mating portion is ⅛" to ¾".

The top mold and the bottom mold are then closed 150, forming a single piece with at least one cavity. For example, in one embodiment of the invention for a 34' boat, approximately eight (8) cavities are formed. Because of the configuration of the top mold and the bottom mold as described above, generally at least one foam introduction hole and at least one ventilation hole are formed through the single piece into the cavity or cavities in the single piece. In the preferred embodiment for a 34' boat, twenty-eight (28) foam introduction holes are formed. However, where there is a plurality of cavities, one or more cavities may have one or more foam introduction holes but no ventilation hole. Also, in some configurations, it may be impractical to introduce foam in one or more of the cavities.

In the preferred embodiment, while the bottom mold and the top mold are closed, the ventilation holes and the foam introduction holes are drilled through the single piece after the single piece is formed 160. Metal bushings in the mold act as guides for forming ventilation holes and foam introduction holes into a cavity in the single piece. In the preferred embodiment, the holes are manually drilled. However, they alternatively may be drilled with automatic machinery. It is also contemplated that the shapes of the top mold and the bottom mold form the foam introduction holes and the ventilation holes, if required.

Foam is then introduced into the cavity through the foam introduction hole or holes 170. The preferred method for introduction of foam is with MeterMix® dispensing equipment, such as a foam gun. Generally, the chemicals comprising the foam are premixed in a container, such as a barrel. The foam is approximately 50% pre-expanded and has a gaseous blowing agent, such as 134A. However, other methods are known in the art. Air in the cavity displaced by the foam is vented through the ventilation hole. When approximately all of the air has been displaced, the injection hole is plugged. Preferably, a toggle clamp or wood plug is used to plug the hole. Both the foam introduction hole and the ventilation hole may be plugged.

The preferred type of foam for this invention is froth type industrial manufacturing foam. Foams such as those manufactured by BASF, or General Latex, Inc.'s Autofroth® may be used. However, other foams are also contemplated by this invention. After the foam has cured, the molds are separated and the single piece filled with foam may be removed from the molds.

In an alternative embodiment, additional steps are taken after the curing of the skin coat. Running strakes on the bottom mold are filled with putty 200 to provide a smooth surface for the laying of the bulk layer of material 120. In the preferred embodiment, the putty is a polyester putty. The putty is smoothed over the strakes; however, other putties and other materials are known in the art providing a smooth layer for the laying of the bulk fiberglass.

Figure 2:
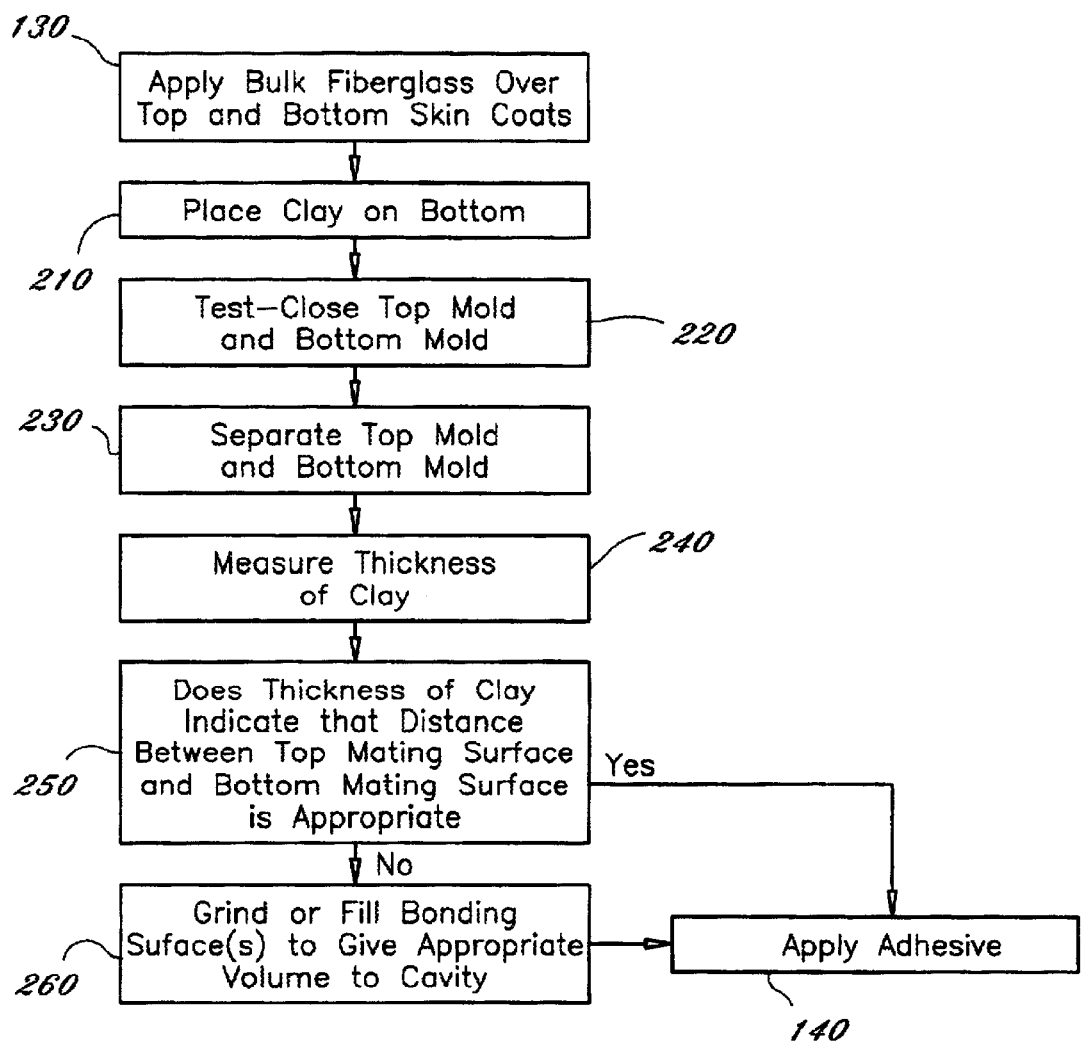
FIG. 2 is a block diagram of a second method for molding a vehicle hull.

In yet another embodiment of the invention, illustrated in FIG. 2, after the bulk fiberglass layers have been laid and cured 130, clay is placed on the bottom bonding surface 210. The clay is used to determine the distance between the top mating surface and the bottom mating surface. Preferably, the clay is modeling or hobby clay, although other materials are known in the art to be suitable for the purpose, including most types of plastiline clay. In the preferred method, balls of modeling clay approximately one to one and one-half inches (1–1.5") in diameter are placed approximately every three (3) to eight (8) feet on the bottom mating surface. However, other equivalent configurations are also contemplated.

The bottom mold and the top mold are then test-closed 220. In the preferred embodiment, the molds are capable of being toggled shut. If the molds are the type that are toggled shut, then it is preferred that all toggles be completely shut. However, the closing of only a fraction of the toggles, such as the front and the back three (3) or four (4) toggles, may also be performed, as long as the test-closing accomplishes the purpose of determining the distance between the top mating surface and the bottom mating surface. After the molds have been closed, the top mold and the bottom mold are then separated 230. The thickness of the resulting mass of clay is then measured 240. In the preferred embodiment for an adhesive such as a methacrylate compound, the thickness of the clay, and thus the resulting distance between the mating surfaces, is ⅛–¾" thick.

As shown in FIG. 2 at 250 and 260, where the thickness is too small, an area on the top bonding surface or the bottom bonding surface, or both, is ground as necessary to provide the proper cavity width. Where the thickness is too great, an area of the top bonding surface or bottom bonding surface, or both, is filled. In the preferred embodiment, the areas needing to be filled are filled with knitted bidirectional knitted fiberglass wetted with resin. Adhesive is then applied to the top mating portion and the bottom mating portion 140, and the method continues as shown in FIG. 1.

Figure 3:
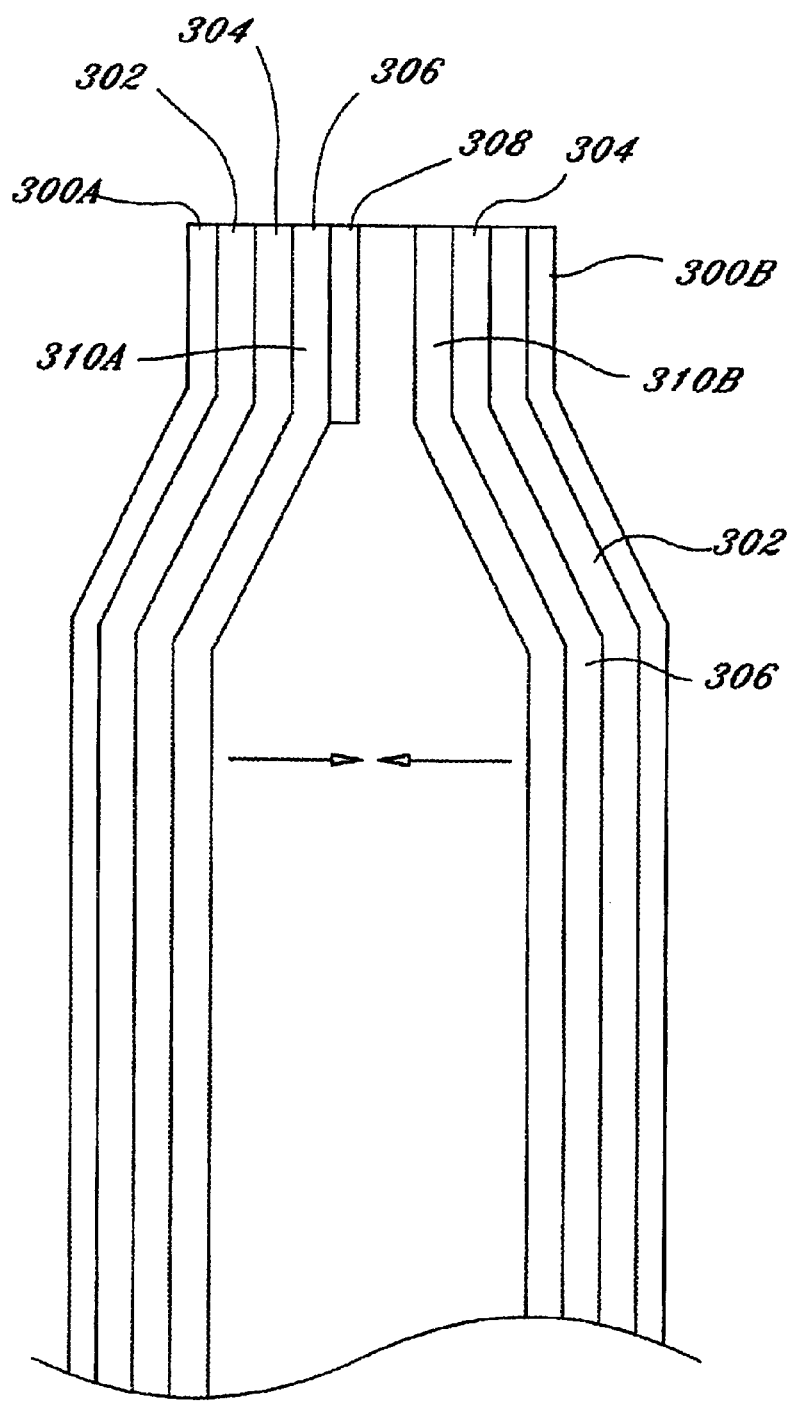
FIG. 3 is a cross sectional diagram of the top piece and the bottom piece of the vehicle hull of the preferred embodiment of the invention before the top mold and the bottom mold are placed together.
Figure 4:
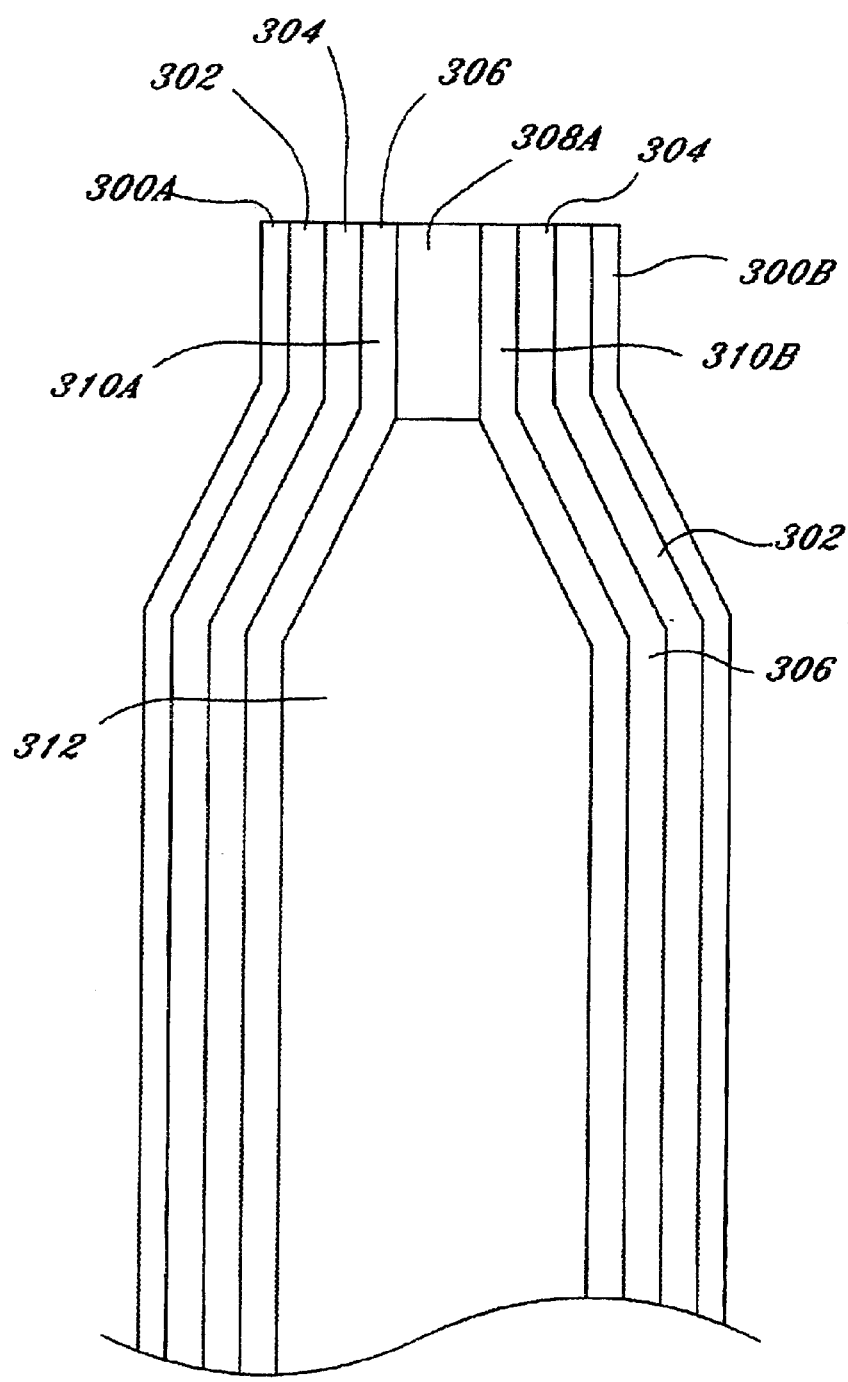
FIG. 4 is a cross section of the finished hull of the invention.

A cross section of the hull of one embodiment of the invention before the top mating surface is brought into contact with the bottom mating surface is illustrated in FIG. 3. A cross section of the finished hull is shown in FIG. 4. FIG. 3 shows both the top mold 300A and the bottom mold 300B. Layered on the molds in FIG. 3 are layers of gel coat 302, skin coat 304, and bulk fiberglass 306. As shown in FIG. 3, adhesive 308 is laid on the top of the top bonding surface 310. The adhesive will be applied onto the bottom bonding surface 312 when the top mold 300A and the bottom mold 300B are brought together, as indicated by the arrows. FIG. 4 illustrates the final single piece, with the adhesive forming the connector at 308A, wherein the cavity formed in the piece has been filled with foam 312.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A method for manufacturing vehicle hulls by molding, reducing or eliminating the need for stringers, comprising the steps of:

applying a top skin coat having a first mating portion within a top mold;

applying a bottom skin coat having a second mating portion within a bottom mold;

applying a structural adhesive to at least one of the mating portions;

closing the top mold and the bottom mold together, thereby forming a structural bond between the first mating portion and the second mating portion and creating a unitary hull piece including at least one cavity, and, after the steps of applying the bottom skin coat and the top skin coat, the steps of:

allowing the bottom skin coat and the top skin coat to cure, and filling one or more running strakes in the bottom mold with putty.

2. A method for manufacturing vehicle hulls by molding, reducing or eliminating the need for stringers, comprising the steps of:

applying a tap skin coat having a first mating portion within a top mold;

applying a bottom akin coat having a second mating portion within a bottom mold;

applying a structural adhesive to at least one of the mating portions;

closing the top mold and the bottom mold together, thereby forming a structural bond between the first mating portion and the second mating portion and creating a unitary hull piece including at least one cavity, further comprising the steps of:

applying a bottom layer of bulk fiberglass over the bottom skin coat and applying a top layer of bulk fiberglass to the top skin coat; and removing air between the bottom layer of bulk fiberglass and the bottom skin coat and air between the top layer of bulk fiberglass and the top skin coat; wherein the mating portions are located on the bulk fiberglass, wherein the step of applying a layer of bulk fiberglass comprises the steps of:

applying at least one layer of chopped roving; and applying at least one layer of knitted bi-directional reinforced fiberglass.

3. The method of claim 2, wherein reinforcements for accessories are added between the steps of applying at least one layer of chopped roving and applying at least one layer of knitted bi-directional reinforced fiberglass.

4. A method for manufacturing vehicle hulls by molding, reducing or eliminating the need for stringers, comprising the steps of:

applying a top skin coat having a first mating portion within a top mold;

applying a bottom skin coat having a second mating portion within a bottom mold;

applying a structural adhesive to at least one of the mating portions;

closing the top mold and the bottom mold together, thereby forming a structural bond between the first mating portion sad the second mating portion and creating a unitary hull piece including at least one cavity, further comprising the steps of:

applying a bottom layer of bulk fiberglass over the bottom skin coat and applying a top layer of bulk fiberglass to the top skin coat; and removing air between the bottom layer of bulk fiberglass and the bottom skin coat and air between the top layer of bulk fiberglass and the top skin coat; wherein the mating portions are located on the bulk fiberglass, further comprising, alter the step of applying the bottom layer of bulk fiberglass and applying the top layer of bulk fiberglass, thereby forming a top bonding surface and a bottom bonding surface, the step of grinding out bumps or overlaps in the bonding surfaces before closing the top mold and the bottom mold together.

5. A method for manufacturing vehicle hulls by molding reducing or eliminating the need for stringers, comprising the steps of:

applying a top skin coat having a first mating portion within a top mold;

applying a bottom skin coat having a second mating portion within a bottom mold;

applying a structural adhesive to at least one of the mating portions;

closing the top mold and the bottom mold together, thereby forming a structural bond between the first mating portion and the second mating portion and creating a unitary hull piece including at least one cavity, further comprising the steps of:

applying a bottom layer of bulk fiberglass over the bottom skin coat and applying a top layer of bulk fiberglass to the top skin coat; and removing air between the bottom layer of bulk fiberglass and the bottom akin coat and air between the top layer of bulk fiberglass and the top skin coat; wherein the mating portions are located on the bulk fiberglass, further comprising, after the steps of applying the bottom layer of bulk fiberglass and applying the top layer of bulk fiberglass, the steps of:

placing clay on the bottom mating portion alter the bottom layer of bulk fiberglass has cured;

test-closing the top mold and the bottom mold together;

separating the top mold and the bottom mold; and measuring the thickness of the resulting mass of clay.

6. The method of claim 5, further comprising the step of resurfacing the bottom mating portion or the top mating portion to accommodate structural adhesive where indicated by a lack or an excess of the optimal thickness of clay.

7. The method of claim 6, wherein the optimal thickness is approximately ⅛" to ¾".

* * * * *